(12) United States Patent
Machuszek

(10) Patent No.: US 12,606,071 B2
(45) Date of Patent: Apr. 21, 2026

(54) MULTI-PURPOSE ORGANIZING TRAY

(71) Applicant: Mark Machuszek, Manhattan Beach, CA (US)

(72) Inventor: Mark Machuszek, Manhattan Beach, CA (US)

( * ) Notice: Subject to any disclaimer, the term of this patent is extended or adjusted under 35 U.S.C. 154(b) by 91 days.

(21) Appl. No.: 18/822,156

(22) Filed: Aug. 31, 2024

(65) Prior Publication Data

US 2024/0416816 A1     Dec. 19, 2024

Related U.S. Application Data

(63) Continuation-in-part of application No. 17/086,750, filed on Nov. 2, 2020, now Pat. No. 12,103,452.

(Continued)

(51) Int. Cl.
    B60N 3/00         (2006.01)
    B60R 11/00        (2006.01)
(52) U.S. Cl.
    CPC ........ B60N 3/005 (2013.01); B60R 2011/001 (2013.01)
(58) Field of Classification Search
    CPC ........... A47B 23/002; A47B 5/02; A47B 5/04; A47B 9/12; B60N 3/005; B60R 11/0252; B60R 2011/001; B60R 2011/0015; B60R 2011/0017; B60R 2011/0059; B60R 2011/0077; B60R 2011/0082

(Continued)

(56) References Cited

U.S. PATENT DOCUMENTS

| | | | | |
|---|---|---|---|---|
| 1,717,433 A | * | 6/1929 | Bragg | B43L 3/008 |
| | | | | 248/447.2 |
| 2,518,127 A | * | 8/1950 | Dobbs | B62D 1/10 |
| | | | | 206/424 |

(Continued)

FOREIGN PATENT DOCUMENTS

| | | | | |
|---|---|---|---|---|
| DE | 29909265 U1 | * | 12/1999 | B60N 3/005 |
| FR | 2854777 A1 | * | 11/2004 | G06F 1/1628 |
| GB | 2150882 A | * | 7/1985 | B43L 3/008 |

OTHER PUBLICATIONS

DE-29909265-U1 Translation, Dec. 16, 1999 (Year: 1999).*
FR-2854777-A1 Translation, Le Gal Christian, Nov. 19, 2004 (Year: 2004).*

*Primary Examiner* — Justin M Larson
*Assistant Examiner* — Matthew T Theis
(74) *Attorney, Agent, or Firm* — Metropolis IP Group, LLC; Eric Kang

(57)         ABSTRACT

A system for a two-shelf, single-assembly tray that is mountable to a circular steering wheel with an inner diameter portion above a vehicle's floorboard at an angle, wherein the angle between the vehicle's floorboard and a plane formed by a circle of the steering wheel is less than 60°, the system comprising a structure having a first side, a second side, and an outer periphery. The structure of this tray further comprises two folds defining three main facets and is constrained within the steering wheel by a plurality of constraining elements. The first constraining element is a type of simple support by the steering wheel on one side of a tongue. The second constraining element is an adjustable strap wrapped around the steering wheel, where the strap incorporates a strip of rigid backing board with a length that is 40-80% of the length of the strap.

12 Claims, 11 Drawing Sheets

Related U.S. Application Data

(60) Provisional application No. 62/933,026, filed on Nov. 8, 2019.

(58) Field of Classification Search
USPC ........................................... 108/44; 224/276
See application file for complete search history.

(56) References Cited

U.S. PATENT DOCUMENTS

| | | | | | |
|---|---|---|---|---|---|
| 5,060,581 | A | * | 10/1991 | Malinski | B60N 3/005 |
| | | | | | 248/441.1 |
| 5,385,283 | A | * | 1/1995 | Shioda | B60N 3/005 |
| | | | | | 224/276 |
| 5,558,026 | A | * | 9/1996 | Seibert | B60N 3/005 |
| | | | | | 224/276 |
| 6,408,769 | B1 | * | 6/2002 | Lewis | B60N 3/005 |
| | | | | | 108/9 |
| 7,017,878 | B2 | * | 3/2006 | Guo | B60N 3/005 |
| | | | | | 224/276 |
| D725,013 | S | * | 3/2015 | Salinas | D12/177 |
| 11,247,597 | B2 | * | 2/2022 | Cooper | B60N 3/005 |
| 2004/0144196 | A1 | * | 7/2004 | Thomas | B60N 3/005 |
| | | | | | 74/558 |
| 2006/0107878 | A1 | * | 5/2006 | Cassata | B60N 3/005 |
| | | | | | 108/44 |
| 2018/0304792 | A1 | * | 10/2018 | Syrianos | B60N 3/005 |

* cited by examiner

MULTI-PURPOSE ORGANIZING TRAY

CROSS-REFERENCE TO RELATED APPLICATIONS

The present application claims priority to U.S. non-provisional patent application Ser. No. 17/086,750 filed on Nov. 2, 2020, which in turn, claims priority to U.S. provisional patent application No. 62/933,026 filed on Nov. 8, 2019, disclosures of which are incorporated herein at least by reference.

FIELD OF THE DISCLOSURE

The invention relates generally to trays, and more particularly to a tray adapted for mounting upon the steering wheel of a motor vehicle.

BACKGROUND OF THE INVENTION

When a motor vehicle is not transporting occupants, it is often used by the occupants as a comfortable and secure setting to do tasks like eating, using an electronic device, reading, relaxing, applying cosmetic make-up, and more. Oftentimes, these tasks are facilitated with large, level surfaces where objects can be placed, such as electronic device(s), food, beverage container(s), eyeglass(es), book(s), make-up, and more. Other than cupholders, a motor vehicle from the driver's seat lacks adequate provisions to hold many of these items safely and securely. Center consoles are off to the side and the area of a flat, level surface is generally too small for many items.

To address this issue at the driver's seat, several tray-like products have been patented and/or are sold in the marketplace. However, all such existing products are too bulky or heavy, and/or too complicated to use, and/or too time-consuming and involved to install/uninstall (especially those requiring tools to tighten or loosen clamps), and/or too impractical/difficult to store, and/or not universally compatible enough, and/or mounted too low or too high.

For example, Syrianos [U.S. Utility Pat. Pub. No. 2018/0304792 A1] teaches a tray with an elongated aperture that the steering wheel is allowed to pass through until the aperture is totally occupied by the steering wheel in some sort of interference fit or when the aperture end of the tray is able to rest on the protruding steering wheel hub below it. The issues with this design are numerous. The relative dimensions of the steering wheel and aperture determine the placed height of the tray, necessitating different aperture dimensions for different steering wheel dimensions. Due to these geometric constraints, the top surface of the tray would be too high to conveniently type or write. Another is the cantilevered design requires both sturdy materials and substantial tray thickness to remain rigid for forces applied near the opposite edge of the aperture. Unfortunately, such a tray would be too cumbersome for many to handle. This tray is also not foldable, which complicates storage.

Salinas [U.S. Design Pat. No. D725,013 S] shows another type of tray with a tongue-like structure passing through the lower cutout of a steering wheel. The design is mounted low enough such that the tray would interfere with the thigh and lower torso of the occupant in the driver's seat. The design also appears to be non-foldable, which complicates storage.

Malinski [U.S. Utility Pat. No. 5,060,581] addresses some of the aforementioned concerns with a foldable steering wheel mounted tray mounted in a more vertically central (i.e., not too high nor too low). The tray is secured to the steering wheel by a restraining strap anchored on each extent at a pair of slits at the distal ends of the panel that is substantially along the same plane as the circular plane of the steering wheel. The tray and restraining strap form a loop that during tray placement, is slipped over the top of the steering wheel and the tray is pulled "downwardly until the loop is taut" or "where the maximum extent of the loop between the right and left sides equals the length of the cord formed between the two portions of the periphery of the steering wheel." Unfortunately, this creates a fault scenario if the steering wheel diameter is too small (sports car steering wheels can be relatively small) relative to the surrounding loop to enable this restraining condition. General applicability within one strap dimension is therefore limited. Furthermore, the inclination of the tray is adjusted by changing the length of the straps between the slits of the adjoining panels, but this length is defined by a tension constraint (strap pull stop) formed by using brads to bunch the strap ends that pass through the respective slits. This is more hassle and complicated than the approach used by the present invention.

Siebert [U.S. Utility Pat. No. 5,558,026] addresses Malinski's tray securement issue by creating a rigid "pocket" geometry to hang the tray on the steering wheel top. The back panel of the pocket in the disclosed figure appears to fit around the steering wheel spoke, which appears necessary to prevent the "body" panel from lifting off the hub of the steering wheel. However, the problem here is the steering wheel needs to be turned before securement such that one steering wheel spoke is vertical as seen by the driver. Furthermore, steering wheel spoke geometry varies from vehicle to vehicle, which in turn creates another issue of general applicability, because the angle between pocket opening angle may not coincide with the angle formed between the steering wheel plane and steering wheel spoke. The rigid nature of the panels forming the pocket also makes it less universal in that it would not conform to a variety of geometries like an elastic-type pouch.

Another limitation is all cited patents, publications, and marketplace offerings disclose just a single-shelf or level tray. Finally, none of the cited patents, publications, and marketplace discloses a tray embodiment that works with steering wheels whose circular plane is substantially horizontal or substantially parallel to the vehicle floorboard, like those seen in buses, commercial heavy-duty trucks, and vehicles where the driver is over or ahead of the steered tires.

SUMMARY OF THE DISCLOSURE

The present disclosure resolves all the previously mentioned issues and offers other utilities with a novel, lightweight, simple-to-use, trivial-to-install and uninstall, versatile, and "one-size-fits-all" steering wheel tray assembly. This disclosure describes two tray assembly embodiments. One tray assembly embodiment applies for a steering wheel whose circular plane is substantially vertical or whose steering column axis is less to substantially less than approximately 60° relative to the vehicle's floorboard. An alternative tray assembly embodiment is designed to work with steering wheels whose circular plane is substantially horizontal or is less to substantially less than approximately 60° relative to the vehicle's floorboard.

One or more of the disclosed embodiments boasts a multitude of features that is not offered nor suggested by the current state-of-the-art. It begins with simple and universal fit mounting of the tray assembly, where the backing of one of the panels of one embodiment has a stretchable securement pouch that slips around the top arch of most late-model steering wheels for a snug friction fit. All embodiments can have more than one adjustable tray shelf instead of one relatively long tray shelf extending too close or into the occupant's body. One or more panels can also be a white-board, where notes can be written and erased. The unique two-hinge architecture of one of the embodiments allows the tray assembly to function as a stand for thin electronic devices like tablets or smartphones.

The relatively flat form factor when the tray is folded (range between approximately ¾ inches to 1.5 inches depending upon the number of shelves and baseboard mate-rial used) lends itself to several other uses beyond its core function. For example, the folded thickness of the tray allows this tray to fill gaps between the front seat and center console or door and effectively prevents small items from falling through the gap occupied by the tray. An optional bib can be attached to one or more tray shelves and be folded away conveniently with the tray after use. The tray's folded dimension and light weight enable potential use as a sun visor extension. When the tray is fully folded, the pouch doubles as a holder for small articles like books and pens. A fully or partially folded tray can also be placed on the user's lap to be used as a "lap tray."

BRIEF DESCRIPTION OF THE DRAWINGS

The drawings are provided to facilitate understanding in the detailed description. It should be noted that the drawing figures may be in simplified form and might not be to precise scale. About the disclosure herein, for purposes of conve-nience and clarity only, directional terms such as top, bottom, left, right, up, down, over, above, below, beneath, rear, front, distal, and proximal are used concerning the accompanying drawings. Such directional terms should not be construed to limit the scope of the embodiment in any manner.

DETAILED DESCRIPTION OF THE DISCLOSURE

Figure 1:
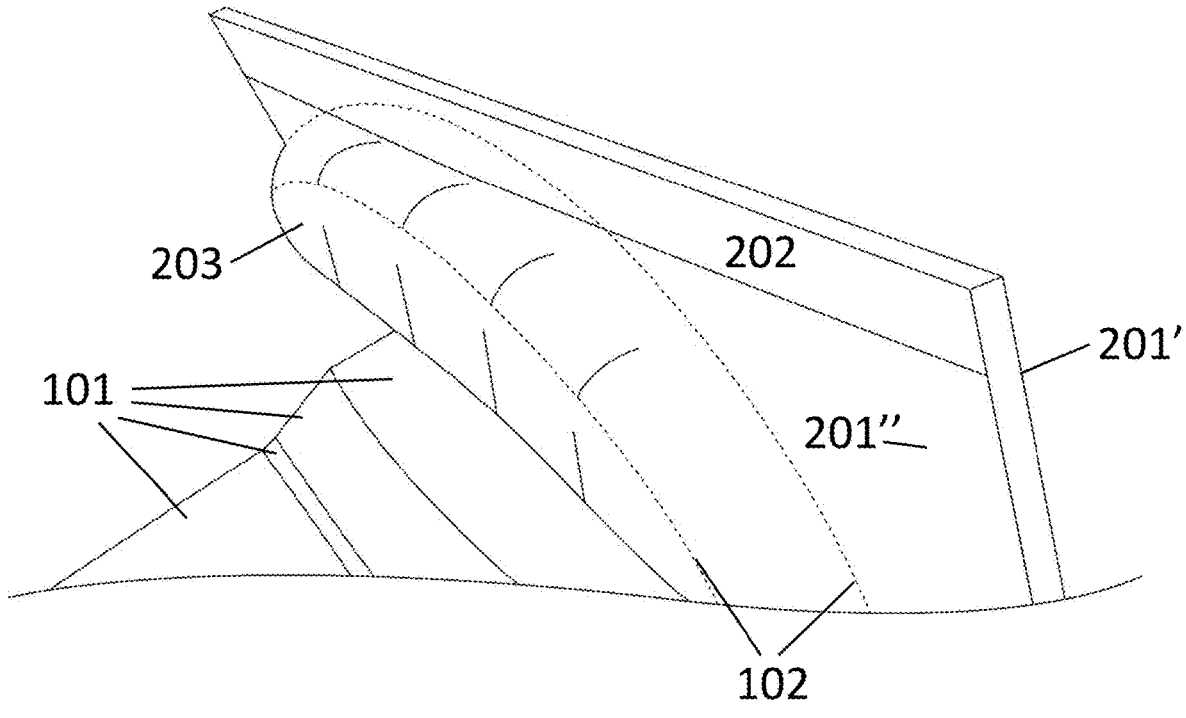
FIG. 1 is a close-up, partial view of one embodiment, tray1, for substantially vertical steering wheels and its universal fit securement pouch slipped onto a steering wheel

PRIMARY COMPONENTS: The following comprises the primary components of the present invention.
1. Plastic, corrugated plastic, acrylic, plywood, or com-posite board
2. Vinyl and/or whiteboard sheets, paint, or stain 3. Elastic material, cloth, nylon fabric, netting, or elastic straps
4. Book tape, tape, plastic, rubber, vinyl tape, piano hinges, or accordion hinges
5. Cord, straps, or metal/plastic straps
6. Self-sticking hook-and-loop fasteners or clips
7. Glue, staples, thread, plastic weld, or rivets Tray1 (200) refers to a tray assembly embodiment that is attachable to substantially vertical steering wheels (102) or steering wheels (102) whose steering column axis (101) is less to substantially less than 60° relative to the vehicle's floorboard. Tray2 (300) refers to a tray assembly embodi-ment that is attachable to steering wheels (103) whose circular plane is substantially horizontal or is less to sub-stantially less than 60° relative to the vehicle's floorboard.

For the present disclosure, the tray's panel surfaces (201, 204, 205, 208, 301, 303, 305) notated by a single quotation (') represents the side of the panel that is on the opposite side of the surface notated with a double quotation ("). Without any notation, these panels (201, 204, 205, 208, 301, 303, 305) signify the entire panel without consideration of a particular side. For referencing hook-and-loop fasteners, the "hook" portion has no post-index notation (i.e., 209) while the "loop" side has a single quotation (i.e., 209').

The dimensions, shape, and nature of construction described below represent those proven to work in prototype testing. However, it must be understood that the illustrated embodiments have been set forth only for example, and that it should not be taken as limiting the embodiment.

CONSTRUCTION OF TRAY1 (Reference FIGS. 1-8): Plastic, wood, acrylic, or composite board can be substituted for each other depending on availability, weight, use, safety, and sanitation requirements. These parts form the structure of the tray assembly unit (201, 204, 205, optionally 208). The rigid panels (201, 204, 205, optionally 208) are gener-ally cut in 7×15 inch rectangles with at least two panels needed to make a single shelf model. The topmost panel (201) may also be curved to conform to the shape of the steering wheel (102), but some potential space is lost for other uses, such as a whiteboard to be described later. These dimensions can be changed depending on use or style. Additional panels can be added to make a bigger, multi-shelf device by simply repeating the attachment methods. In the illustrated two-shelf tray1 embodiment (FIGS. 1-8), the panels (201, 204) form the backboard structure that lays against the steering wheel (102). From FIGS. 2-4, the illustrated bottom edge of the topmost panel (201) connects to the top edge of the panel (204) in a manner to be described later when describing panel hinges. An alternative to this configuration would be to have a one-piece non-folding backboard (not shown) approximately the size of the steer-ing wheel (102); however, this alternative embodiment cannot collapse to a smaller footprint and would be more difficult to stow.

Figure 2:
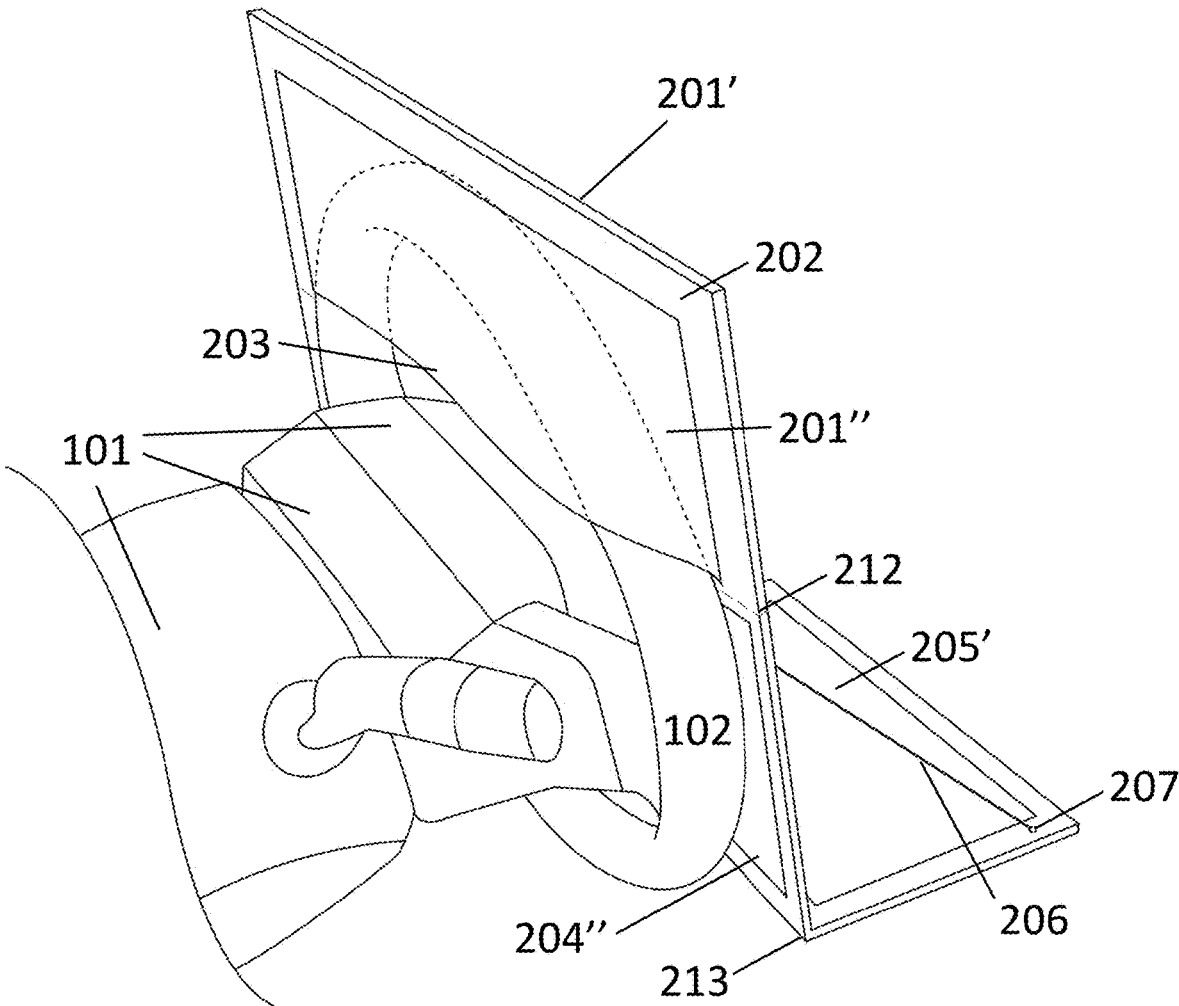
FIG. 2 is a view of tray1 secured to the steering wheel
Figure 3:
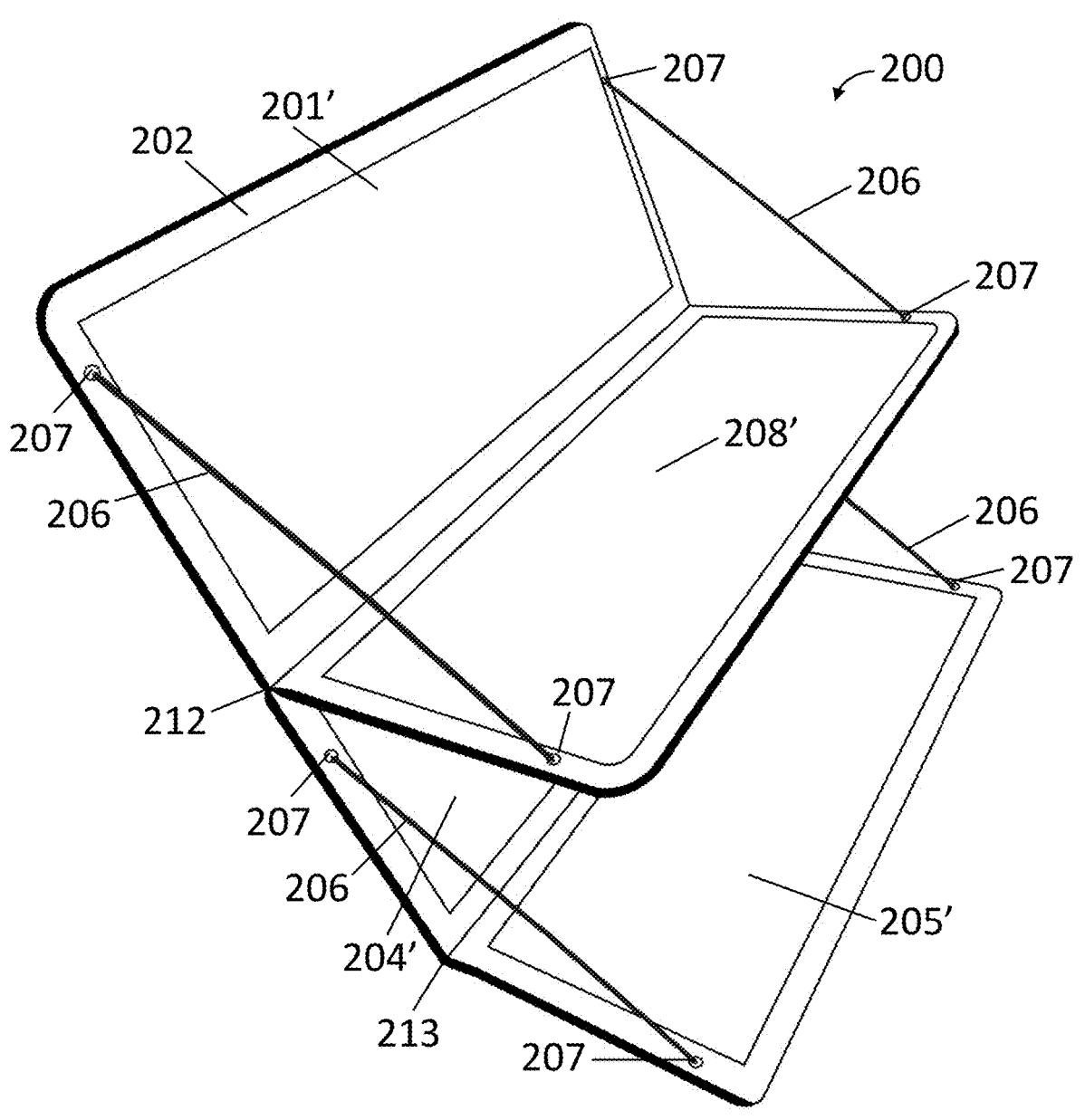
FIG. 3 is an angled, overhead view of tray1

Elastic cloth/band/strap, netting, or cloth/nylon material is glued, stapled, or otherwise connected to the back of the topmost panel (201") to form a "universal fit" securement pocket (203) that slides on/over the steering wheel (102) to support tray1 (200), as illustrated in FIGS. 1 and 2. This method makes the tray1 (200) simple and easy to use on most modern steering wheels. Alternative attachments could be made with clips or press-fit clips, fold-out hooks, fabric slings, molded plastic (shaped like a steering wheel), or hook-and-loop fasteners, although these methods would be more inconvenient and time-consuming than the preferred elastic securement pouch (203) attachment embodiment.

Vinyl sheeting, whiteboard material, and paint/stain can cover/seal all or part of tray1 (200) to form a non-porous, easy-to-clean, waterproof, smooth, colored surface. Additionally, if the backboard panels (201, 204) and shelves (205, optionally 208) are made of plastic, no paint/stain or covering is necessarily required but may be used to change color or add a whiteboard option. The whiteboard option can cover one or more of the front surfaces of the backboard (201', 204') and shelves (205', 208') to allow for erasable notetaking.

The 15" horizontal edges of the backboard (201, 204) and shelves (205, optionally 208) are connected with "book tape" or any durable tape, cloth, plastic, rubber, silicon, vinyl, piano hinges, or accordion hinges; regardless of method (tape, vinyl, piano hinge, etc.), the element that joins one panel to another is called a "hinge" in this disclosure. Hinge (212) joins the backboard panels (201, 204) and optionally, the upper shelf panel (208) as clearly shown in FIGS. 2-7. Hinge (213) joins the lowest-most backboard panel (204) and lower shelf (205) as clearly shown in FIGS. 2-7. A panel-to-panel gap of at least ½" between the panels is preferred before attaching hinges (212, 213) to create the necessary clearance that enables a 360° range of motion and allows the panels to fold up (when the unit is not in use). This is the same way a "book" opens and closes. The preferred hinging method is book tape (202) or equivalent.

Furthermore, each panel (201, 204, 205, optionally 208) is taped (202) on both sides and the part of the tape that covers each ½" panel-to-panel gap forms a one-piece hinge (212, 213) at the corresponding panel-to-panel junction. Alternatively, vinyl sheeting, thin plastic, or other flexible material could layer all the panels (201, 204, 205, optionally 208) and the panel-to-panel gaps on both sides so that hinges (212, 213) are naturally created. Next, book tape (202), rubber, edge trim, vinyl, plastic, or equivalent material wraps and finishes off the perimeter of the entire unit, as shown in FIGS. 1-7.

FIG. 1 shows tray1 (200) in two-shelf-level form, where the upper shelf level is provided by a panel (208) and the lower shelf level is provided by a panel (205). The upper shelf panel (208) is hinged at the same hinge (212) junction between panel (201) and panel (204). FIG. 2 is similar to FIG. 1 except panel (208) is shown to be partially folded about the hinge (212) to show the underside surface (208") along with the "hook" (209) and "loop" (209') fasteners to be described later. Tray1 (200) can also have a single-level variant, which simply does not have the panel (208) along with the associated cords (206), pre-drilled cord holes (207), and hook-and-loop fasteners (209, 209').

Figure 4:
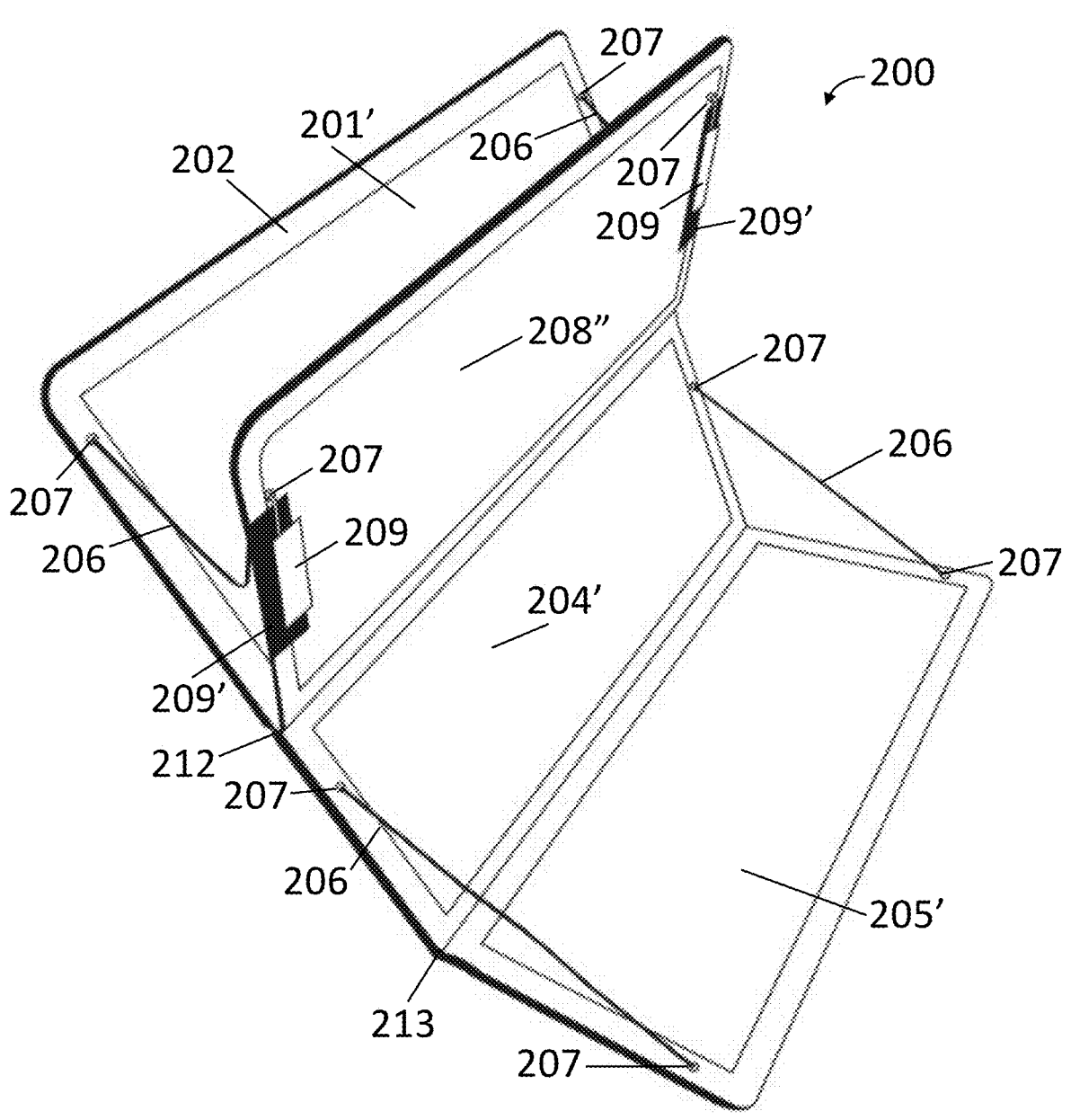
FIG. 4 is an angled, overhead view of tray1 with the upper shelf partially folded
Figure 5:
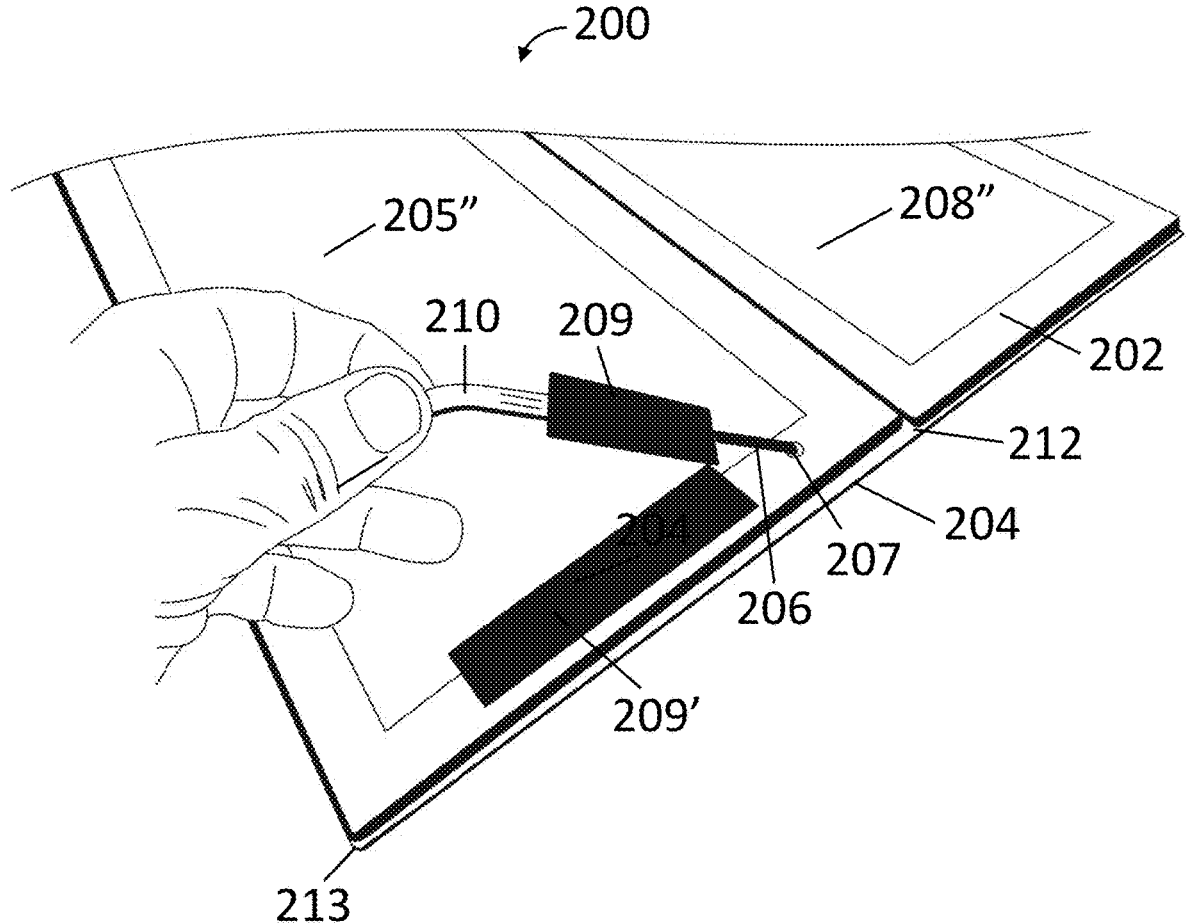
FIG. 5 shows a pair of hook-and-loop fasteners on tray1 that secure the suspension cord

Cords or straps (206) disposed through pre-drilled holes (207) on two or more panels (201, 204, 205, optionally 208), are clearly shown in FIGS. 3-7. One end of each cord is stapled/glued to the left and right sides of the top backboard panel (201", 204") with the other end of each cord extending to and disposed through the left or right holes (207) of each shelf panel (205, optionally 208). As shown in FIGS. 4 and 5, the end of the cord/strap has a "hook" fastener (209) attached to it, with its mating "loop" fastener (209') attached to the corresponding bottom of the shelf(s) (205", optionally 208"). This cord and fastening assembly (206, 209, 209') creates the shelf suspension system for leveling/height adjustment. As only shown in FIG. 5, a small pull tab can be attached (210) to the open end of the "hook" fastener (209) to help the user pull on the cord (206). Alternatively, the cord (206) could loop around the shelf/shelves (205, optionally 208) and/or attach via notches, buttons, snaps, thin metal, or plastic straps/rods could also be used to support the shelves (205, optionally 208) from either the top (suspension) or the bottom (pillar). Staples, glue, thread, rivets, or plastic weld can be also used.

Figure 6:
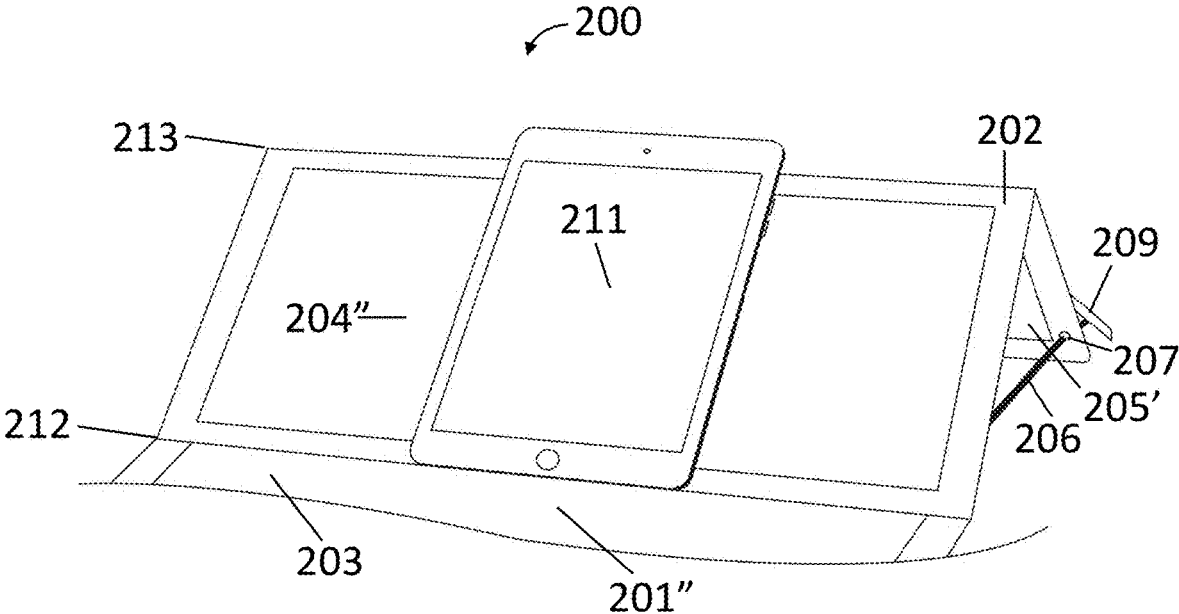
FIG. 6 is a view of tray1 functioning as an electronic device stand

ANCILLARY USES OF TRAY1 (Reference FIGS. 6-8): FIG. 6 shows tray1 (200) folded at hinge (212) and hinge (213) such that it forms a "V" shape with the open end of the "V" along the flat surface which the tray1 (200) rests. The back surfaces of tray1 (201", 204", 205") face away from the resting surface. FIG. 6 shows an electronic device, such as a "tablet" (211) placed on the back surface of panel (204") and the edge of the back surface of panel (201").

Figure 7:
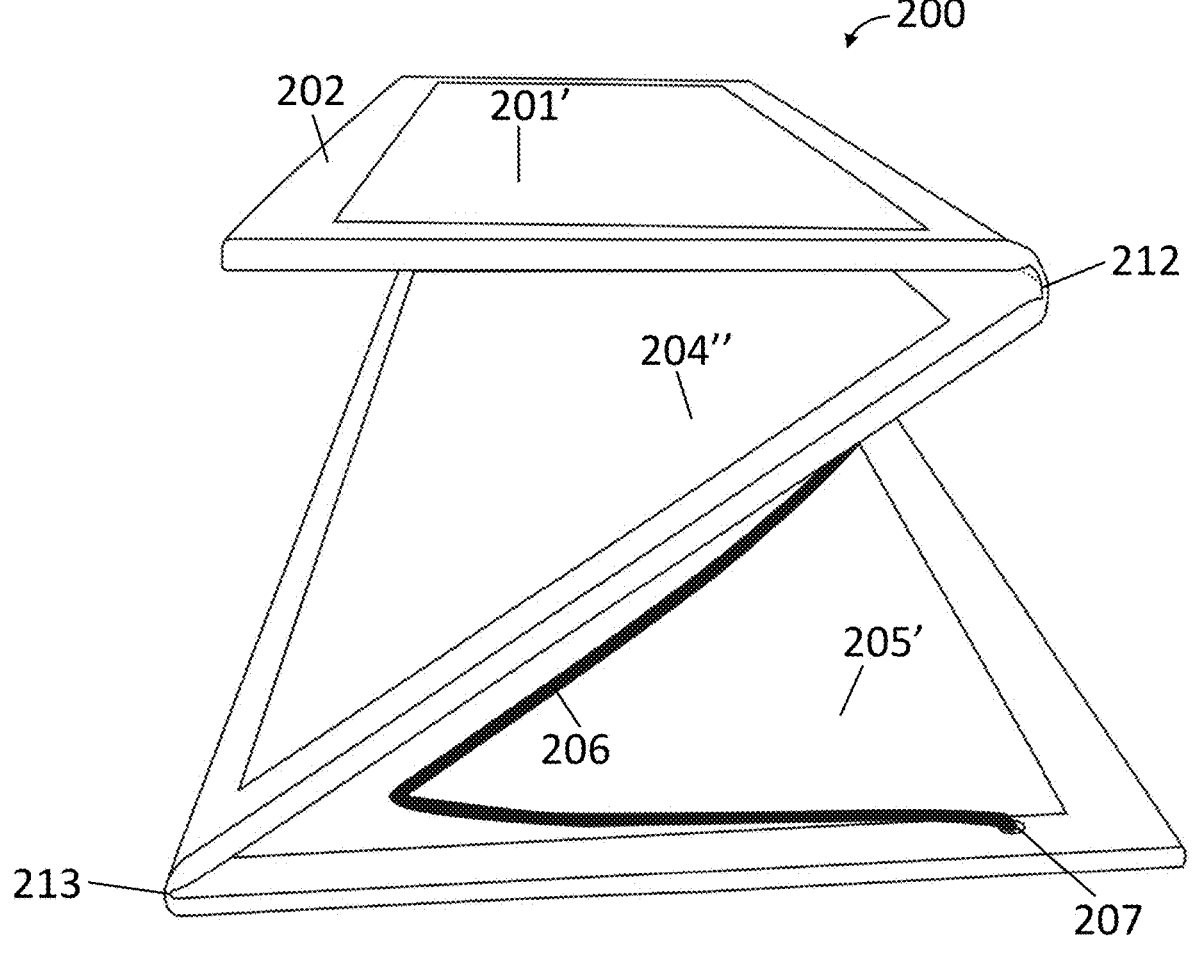
FIG. 7 is a side view illustrating the two-hinge "Z" fold design of tray1

FIG. 7 shows the mostly side profile of tray1 (200) in a semi-folded state. The key here is the alternating "Z" style folding about the hinges (212, 213) which allows the large surface area of tray1 (200) to be collapsible to a very compact form. Tray1 (200) is its fully-folded state when the top panel back surface (201") is folded flat on the middle panel back surface (204") and the middle panel front surface (204') is folded flat on the bottom panel front surface (205'). In this full-folded state, tray1's (200) relatively thin form factor (ranging between approximately ¾ inches to 1.5 inches depending upon the number of shelves and baseboard material used) permits fitment between narrow areas of the vehicle, such as between the seat and center console or transmission driveline tunnel or door, yet is thick enough to prevent small objects from falling through and getting lost in the space occupied by the tray1 (200).

Figure 8:
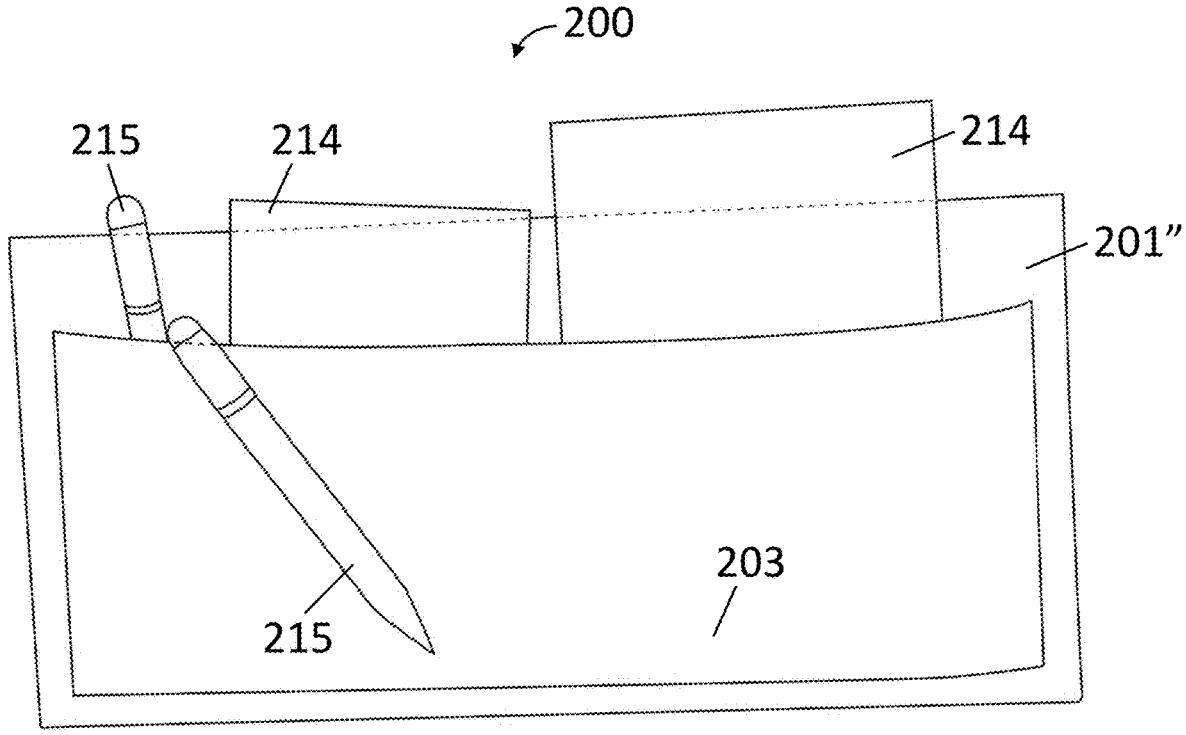
FIG. 8 shows tray1 used as a carrying case for small items

FIG. 8 shows a view of the tray assembly (200) if the pouch (203) side is deemed as the top surface. Small articles such as books (215) and pens (216) can be carried as shown to show the tray assembly (200) functioning as a carrying case.

Figure 9:
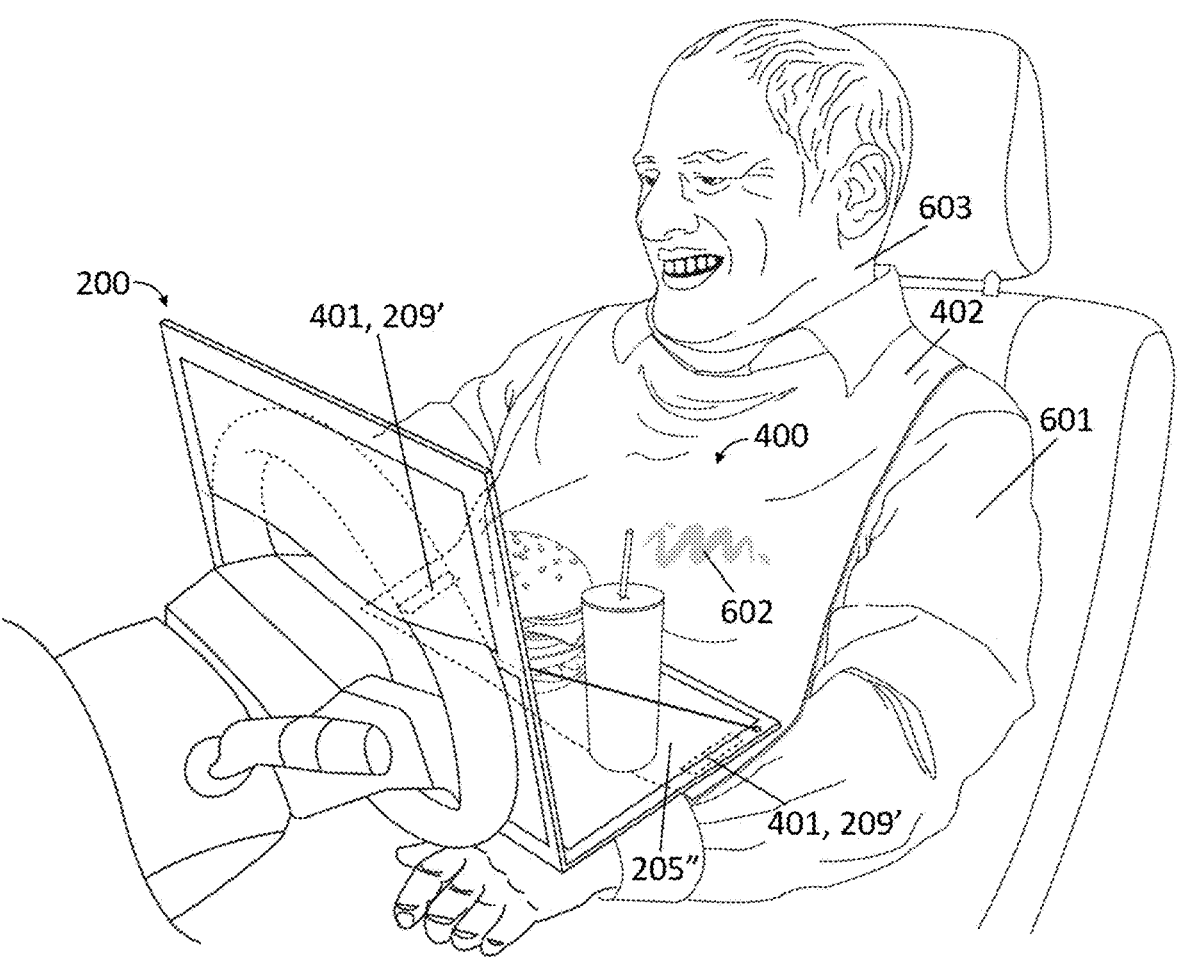
FIG. 9 is a view of a bib anchored to tray1 and a user seated on a vehicle seat

An optional bib, as shown in FIG. 9, can be attached to tray1 (200). When tray1 (200) is opened, a washable cloth or waterproof nylon bib (400) can have "hook" fasteners (401) attached at one edge of the bib connected to the "loop" (209') fasteners on the bottom surface of any of the shelves (205", optionally 208"). The bib (400) drapes over and shields the user's apparel (601) from food or objects (602) falling from above the bib. The edge of the bib opposite to the edge connected to tray1 (200) can connect to the user by way of an over-neck-like-leash (402) that links the bib (400) to the user's neck (603) or attaches to a collar around the user's neck. This bib (400) can neatly fold into tray1 (200) when the tray1 (200) is closed.

A fully or partially folded tray1 (200) can also be placed on the user's lap to be used as a "lap tray." Tray1 (200) when folded has the combination of lightweight and dimensions to be potentially used as a sun visor extension when the vehicle is parked. These uses are not directly illustrated in any of the figures.

CONSTRUCTION OF TRAY2 (Reference FIGS. 10-11): Much of the other existing steering wheel trays cater to the type of steering wheel (102) where the circular plane is substantially vertical or whose steering column axis (101) is less to substantially less than 60° relative to the vehicle's floorboard. However, for vehicles like many heavy-duty commercial trucks, buses, and some vans where the driver sits nearly over or ahead of the steered tires, such a tray would not be mountable nor functional even if mountable because the tray surfaces would be substantially tilted.

Figure 10:
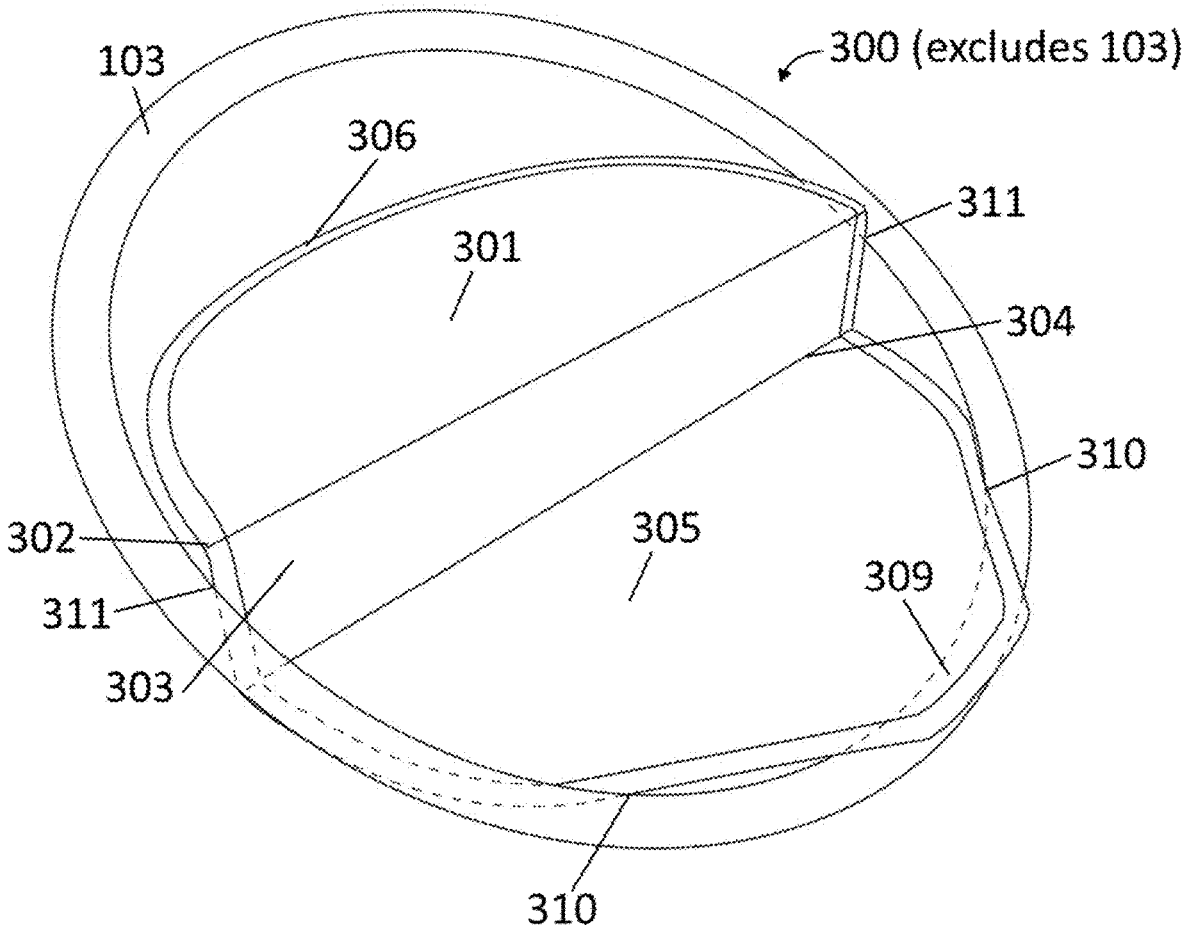
FIG. 10 is an angled, overhead view of an alternative embodiment, tray2, for substantially horizontal steering wheels
Figure 11:
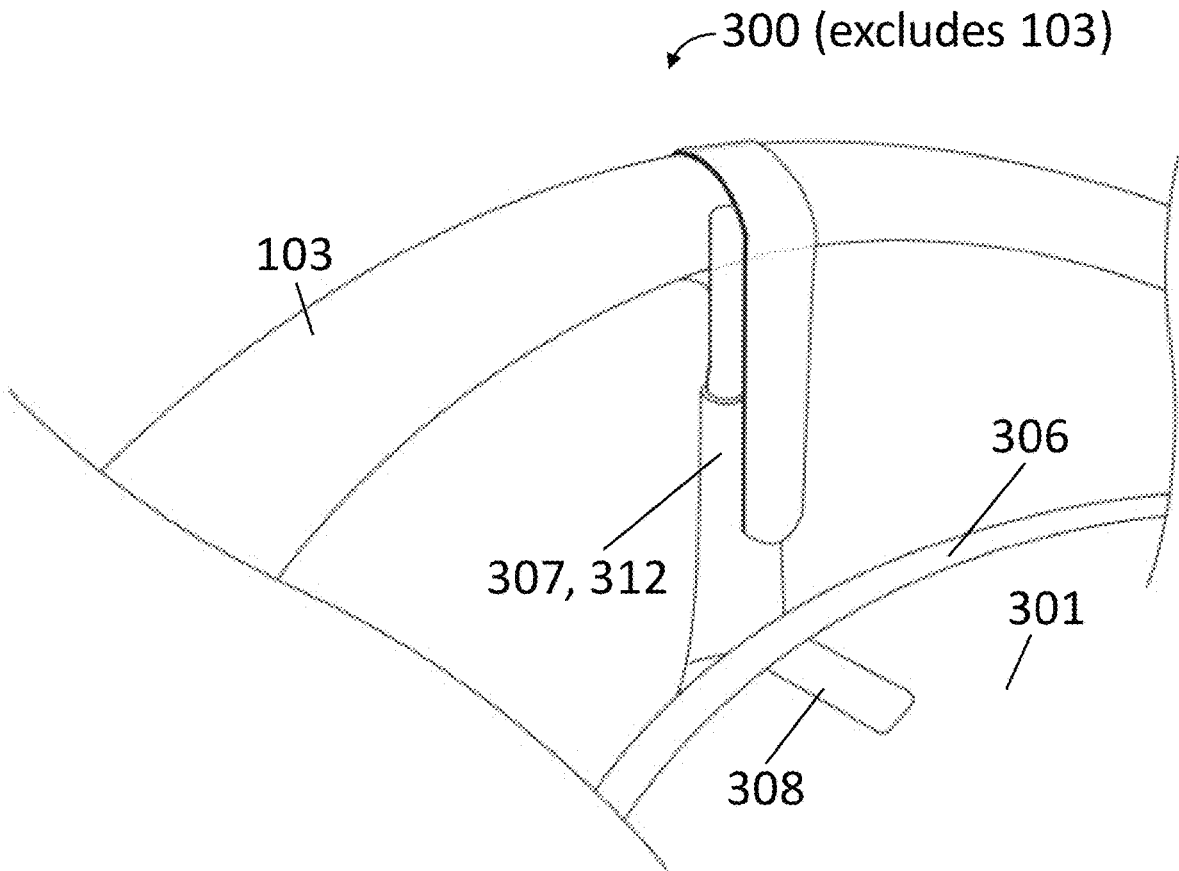
FIG. 11 is a partial view of one portion of tray2 attached to a steering wheel using a novel securement strap

This scenario necessitates a different approach, and the present invention discloses an alternative embodiment for such applications, called tray2 (300) in this disclosure. FIGS. 10-11 show this alternative embodiment comprising of the following elements/parts (301-312).

All the materials and recommendations to make the boards, surface covers, and hinges of tray2 (300) can be the same ones indicated in the disclosure of the earlier mentioned tray1 (200). Tray2 panels or facets (301, 303, 305), when mounted on the steering wheel (103), have a similar but slightly smaller overall diameter than the inner diameter of the steering wheel (103), allowing it to drop/press in place.

Tray2 (300) has a structure having a first side, where the first side of facets (301, 305) faces in the direction toward the vehicle's floorboard, a second side that is opposite to the first side, and a bezel or an outer periphery (306) stitched throughout the structure's entire circumference. The bezel (306) can be press-sealed, a melded plastic, taped, or press-fitted with edging material. FIG. 10 shows an embodiment of tray2 (300) without any support strap, which will be described later.

Tray2 (300) further comprises two folds (302, 304) or hinges defining three main facets, an upper-level facet (301), a lower-level facet (305), and a level-bridging facet (303). The lower-level facet (305) further comprises a tongue (309) that shares the same first and second sides as the lower-level facet. This tongue (309) is an elongation of the lower-level facet (305) along a direction away from the second fold (304) so that the first side of the tongue is placeable on the steering wheel.

The first of the two folds (302) is formed by adjoining the upper-level facet (301) with the level-bridging facet (303) while the second fold (304) is formed by adjoining the lower-level facet (305) with the level-bridging facet (303). The first fold (302) has an angle of less than 180° on the first side and the second fold (304) has an angle of less than 180° on the second side. The resulting form is a unique two-shelf, single-assembly tray (300), where an upper shelf is formed by the upper-level facet (301) and a lower shelf is formed by the lower-level facet (305).

The structure of tray2 (300) is constrained within the steering wheel (103) by a plurality of constraining elements. The first of the constraining elements is a type of simple support by the steering wheel (103) where the first side of the tongue (309) rests anywhere between approximately the 4 o'clock to 8 o'clock position of the steering wheel. In the exemplary embodiment, the steering wheel (103) is in contact with the first side of the tongue (309) at the 6 o'clock portion of the steering wheel.

FIG. 11 shows the second constraining element, which comprises a novel strap (307). This strap (307), comprising of two ends and a hook-and-loop fastener, holds the upper-level facet (301) of the tray2 (300) horizontally and is adjustable for height because of the length of the hook-and-loop fastener along the strap (307) is long enough to offer adjustability.

One of the two ends of the strap (307) is fastened (e.g., stitched, glued, etc.) to a portion (308) of the upper-level facet (301) that would be approximately at the 12 o'clock portion of tray2 (300). The strap (307) is long enough to be looped around the 12 o'clock portion of the steering wheel (103) before being fastened onto itself to form a restraining loop for the structure, as shown in FIG. 11.

One of the key enablers in reducing the tray2 (300) embodiment to practice is the specific fraction or percentage of the strap's (307) total length that needs to be rigid while the remaining portion is flexible. While the facet-to-facet hinges (302, 304) and modest constraints (tongue resting on the steering wheel and interference fit at two more points that will be described later) made for easy and rapid placement/removal/storage, early versions of tray2 (300) were beset with significant stability issues (e.g., wobbling around too much) after installation on the steering wheel (103).

However, through significant experimentation, it was found that attaching or incorporating a strip of rigid backing board for 40-80% of the strap's (307) total length and placing the rigid backing board between the upper-level facet (301) and the steering wheel (103) provided an optimal mix of positioning stability and some mounting compliance/tolerance. In the exemplary embodiment, the rigid portion (312) of the strap would be within a substantial portion of the vertical part shown in FIG. 11. In the exemplary prototype, the 5-inch-long strap (307) has an approximately 1-inch-wide×3-inch-long strip of rigid backing board, which is made of the same material suitable for the shelves of tray1 (200) and is sandwiched between the "hook and loop" parts of the hook and loop fasteners.

The third constraining element comprises the outer periphery (306) of the lower-level facet (305) engaged via an interference fit with the inner diameter portion of the steering wheel (103) at a plurality of locations (310) on the lower half of the steering wheel. Alternatively, or in addition to an interference fit at a plurality of locations (310) on the lower half of the steering wheel (103), the lateral positioning of tray2 (300) may be provided with an interference fit between the outer periphery (306) of the level-bridging facet (303) at a plurality of locations (311) on the right and left halves of the steering wheel (103).

The shape and dimensions of the periphery (306) of the level-bridging facet (303) relative to the inner portion of the steering wheel (103) may be such that instead of an interference fit, there could be some clearance or gap between the periphery of the level-bridging facet (303) and the right and left halves of the steering wheel (103). The total clearance between the periphery of the level-bridging facet (303) and the right and left halves of the steering wheel (103) may be approximately ⅛ inch to 2 inches.

Many alterations and modifications may be made by those having ordinary skill in the art without departing from the spirit and scope of the embodiments. Therefore, it must be understood that the illustrated embodiments have been set forth only for example, and that it should not be taken as limiting the embodiments.

The words used in this specification to describe various embodiments are to be understood not only in the sense of their commonly defined meanings but to include by special definition in this specification structure, material, or acts beyond the scope of the commonly defined meanings.

The invention claimed is:

1. A system for a two-shelf, single-assembly tray that is mountable to a circular steering wheel with an inner diameter portion above a vehicle's floorboard at an angle, wherein said angle between the vehicle's floorboard and a plane formed by a circle of said steering wheel is less than 60°, said system comprising:

a structure having a first side, a second side, and an outer periphery;

wherein said structure further comprises two folds defining three main facets;

wherein one of said main facets is an upper-level facet;

wherein a second of said main facets is a lower-level facet;

wherein a third of said main facets is a level-bridging facet;

said two folds consist of a first fold and a second fold;

wherein the first fold is formed by adjoining said upper-level facet with said level-bridging facet;

wherein the second fold is formed by adjoining said lower-level facet with said level-bridging facet;

wherein the first fold has an angle of less than 180° on the first side;

wherein the second fold has an angle of less than 180° on the second side;

said lower-level facet further comprising a tongue;

wherein the structure is constrained within said steering wheel, when in use, by a plurality of constraining elements;

wherein a first of said constraining elements is a type of simple support by said steering wheel, when in use, at its 6 o'clock location on the first side of said tongue;

wherein a second of said constraining elements is an adjustable strap wrapped around said steering wheel, when in use;

said strap comprising two ends and a hook and loop fastener;

wherein one of the two ends of said strap is fastened or stitched to the upper-level facet;

wherein said strap is long enough to be looped around the 12 o'clock portion of the steering wheel, when in use, before being fastened onto itself to form a restraining loop for said structure;

wherein said strap is attached to or incorporates a strip of rigid backing board with a length that is 40-80% of the length of said strap;

said rigid backing board of said strap is situated between said upper-level facet and said steering wheel, when in use.

2. The system as recited in claim 1, wherein said tongue is an elongation of the lower-level facet along a direction away from the second fold so that the first side of said tongue is placeable on said steering wheel, when in use.

3. The system as recited in claim 1, wherein a third of said constraining elements comprises the outer periphery of said lower-level facet engaged via an interference fit with the inner diameter portion of said steering wheel, when in use, at a plurality of locations.

4. The system as recited in claim 1, wherein a third of said constraining elements comprises the outer periphery of said level-bridging facet engaged via an interference fit with the inner diameter portion of said steering wheel, when in use, at a plurality of locations.

5. A system for a two-shelf, single-assembly tray that is mountable to a circular steering wheel with an inner diameter portion above a vehicle's floorboard at an angle, wherein said angle between the vehicle's floorboard and a plane formed by a circle of said steering wheel is less than 60°, said system comprising:

a structure having a first side, a second side, and an outer periphery;

wherein said structure further comprises two folds defining three main facets;

wherein one of said main facets is an upper-level facet;

wherein a second of said main facets is a lower-level facet;

wherein a third of said main facets is a level-bridging facet;

said two folds consist of a first fold and a second fold;

wherein:

the first fold is formed by adjoining said upper-level facet with said level-bridging facet;

the second fold is formed by adjoining said lower-level facet with said level-bridging facet;

the structure is constrained within said steering wheel, when in use, by a plurality of constraining elements;

one of said constraining elements is an adjustable strap wrapped around said steering wheel, when in use;

said strap comprising two ends and a hook and loop fastener;

wherein:

one of the two ends of said strap is fastened or stitched to the upper-level facet;

said strap is long enough to be looped around the steering wheel, when in use, before being fastened onto itself to form a restraining loop for said structure;

said strap is attached to or incorporates a strip of rigid backing board with a length that is 40-80% of the length of said strap;

said rigid backing board of said strap is situated between said upper-level facet and said steering wheel, when in use.

6. The system as recited in claim 5, wherein the first fold has an angle of less than 180° on the first side and the second fold has an angle of less than 180° on the second side.

7. The system as recited in claim 5, wherein said lower-level facet further comprising a tongue.

8. The system as recited in claim 7, wherein said tongue is an elongation of the lower-level facet along a direction away from the second fold so that the first side of said tongue is placeable on said steering wheel, when in use.

9. The system as recited in claim 8, wherein another one said constraining elements is a type of simple support by said steering wheel, when in use, at the 4 o'clock to 8 o'clock position of said steering wheel acting on the first side of said tongue.

10. The system as recited in claim 5, wherein said strap is long enough to be looped around the 12 o'clock portion of the steering wheel, when in use.

11. The system as recited in claim 5, wherein another one of said constraining elements comprises the outer periphery of said lower-level facet engaged via an interference fit with the inner diameter portion of said steering wheel, when in use, at a plurality of locations.

12. The system as recited in claim 5, wherein another one of said constraining elements comprises the outer periphery of said level-bridging facet engaged via an interference fit with the inner diameter portion of said steering wheel, when in use, at a plurality of locations.

\* \* \* \* \*